(12) United States Patent
Li et al.

(10) Patent No.: US 9,769,351 B2
(45) Date of Patent: Sep. 19, 2017

(54) METHOD FOR REPRODUCING IMAGES AND IMAGE-PROCESSING APPARATUS USING THE METHOD

(71) Applicant: AVISION INC., Hsinchu (TW)

(72) Inventors: Chen-Chang Li, Toufen Township, Miaoli County (TW); Ching-Ching Lin, Zhubei (TW); Seifor Hsu, Chu-Pei (TW)

(73) Assignee: Avision Inc. (TW)

( * ) Notice: Subject to any disclaimer, the term of this patent is extended or adjusted under 35 U.S.C. 154(b) by 0 days.

(21) Appl. No.: 15/098,666

(22) Filed: Apr. 14, 2016

(65) Prior Publication Data

US 2016/0316104 A1    Oct. 27, 2016

(30) Foreign Application Priority Data

Apr. 27, 2015   (TW) .............................. 104113340 A

(51) Int. Cl.
*H04N 1/393*   (2006.01)
*H04N 1/00*    (2006.01)
*H04N 1/387*   (2006.01)

(52) U.S. Cl.
CPC ......... *H04N 1/393* (2013.01); *H04N 1/00708* (2013.01); *H04N 1/00718* (2013.01);
(Continued)

(58) Field of Classification Search
CPC ..................................................... H04N 1/393
(Continued)

(56) References Cited

U.S. PATENT DOCUMENTS 5,970,183 A * 10/1999 Amemiya ............. G06T 7/0083
                                                 382/282
6,883,046 B2   4/2005 Shih et al.
(Continued)

FOREIGN PATENT DOCUMENTS

CN    100534119    8/2009
CN    102340610    2/2012
(Continued)

*Primary Examiner* — Jacky X Zheng

(57) ABSTRACT

A method for reproducing images comprises the steps of: obtaining $1^{st}$ to $N^{th}$ scan images in order, where N is a positive integer greater than 2; processing the $1^{st}$ to $N^{th}$ scan images into $1^{st}$ to $N^{th}$ document images and obtaining sizes of the $1^{st}$ to $N^{th}$ document images; and performing an ordered document typesetting according to an ordered accumulated size of the $1^{st}$ to $N^{th}$ document images to generate image data corresponding to one or multiple output pages. An image-processing apparatus is also provided. Thus, it is possible to prevent the waste of printing a small-size document image on a large-size sheet, and the user can obtain the order of documents according to the order of the output pages. So, an instinctive and environment protective copying technical solution can be provided, and an output result can be further adjusted.

18 Claims, 14 Drawing Sheets

(52) U.S. Cl.
CPC ....... *H04N 1/00748* (2013.01); *H04N 1/3873* (2013.01); *H04N 1/3876* (2013.01); *H04N 1/3878* (2013.01); *H04N 1/3877* (2013.01); *H04N 2201/0094* (2013.01)

(58) Field of Classification Search
USPC ......................................................... 358/1.2
See application file for complete search history.

(56) References Cited

U.S. PATENT DOCUMENTS

| | | | |
|---|---|---|---|
| 2005/0140991 A1* | 6/2005 | Ogiwara | H04N 1/3875 358/1.2 |
| 2008/0297811 A1* | 12/2008 | Pierce | H04N 1/00408 358/1.6 |
| 2010/0134825 A1* | 6/2010 | Pierce | H04N 1/0035 358/1.15 |
| 2010/0215285 A1 | 8/2010 | Tu et al. | |
| 2012/0188567 A1 | 7/2012 | Sheng | |
| 2014/0293353 A1 | 10/2014 | Nagata | |
| 2015/0324954 A1* | 11/2015 | Palanivel | G06T 3/40 358/474 |

FOREIGN PATENT DOCUMENTS

| | | |
|---|---|---|
| CN | 103907339 | 7/2014 |
| TW | I245226 | 12/2005 |
| TW | 201032179 | 9/2010 |
| TW | 201106297 | 2/2011 |
| TW | 201233135 | 8/2012 |
| TW | 201448561 | 12/2014 |

* cited by examiner

METHOD FOR REPRODUCING IMAGES AND IMAGE-PROCESSING APPARATUS USING THE METHOD

This application claims priority of No. 104113340 filed in Taiwan R.O.C. on Apr. 27, 2015 under 35 USC 119, the entire content of which is hereby incorporated by reference.

BACKGROUND OF THE INVENTION

Field of the Invention

The present invention relates to a method for reproducing images and an image-processing apparatus using the method.

Related Art

Conventional digital copiers, multi-function peripherals or other copy apparatuses are typically used to scan originals with the same size, and then the output corresponding to the size is executed. Some copy apparatuses have a certificate or 2-in-1 copy function to satisfy the user's requirement for copying the certificate. If a certificate, such as an identification card, is to be copied, the user can set the machine to a certificate copying mode before copying, and then start a copy process. Although the contents of the front and reverse sides of the certificate can be printed on the same page of the sheet, the user must know how to place the certificate, and the user has already known the sizes of the certificate and the copy sheet, wherein the size of the certificate is usually much smaller than one half of the size of the copy sheet. Thus, the copier needs not to perform the size determination and comparison.

Furthermore, when the user has a stack of originals with different sizes to be copied, the user only can copy the originals on the copy sheets with the same size, and then perform the cropping processes. In this manner, a lot of sheets are wasted, and this is disadvantageous to the environment protective requirement. Although the typesetting can be performed through the image processing software, it is time-consuming to perform the typesetting, and it is a great obstruction to the user who is unfamiliar with the software operation.

SUMMARY OF THE INVENTION

Accordingly, the present invention has been proposed to solve the problems of the prior art, and an object of the present invention is to provide a method for reproducing images and an image-processing apparatus capable of performing judgement and comparison according to an accumulated size of documents and sizes of output pages to arrange document images on one or multiple output pages in order, and process the document images into image data corresponding to the one or multiple output pages in order. The present invention may also be applied to documents particularly having different sizes.

To achieve the above-identified object, the present invention provides a method for reproducing images. The method comprises the steps of: obtaining $1^{st}$ to $N^{th}$ scan images in order, where N is a positive integer greater than 2; processing the $1^{st}$ to $N^{th}$ scan images to obtain $1^{st}$ to $N^{th}$ document images and sizes of the $1^{st}$ to $N^{th}$ document images; and performing an ordered document typesetting according to an ordered accumulated size of the $1^{st}$ to $N^{th}$ document images and generating image data corresponding to one or multiple output pages.

The present invention also provides an image-processing apparatus comprising a scanning module, a feeder and a processing module. The feeder transports documents past the scanning module. The scanning module scans the documents and obtains $1^{st}$ to $N^{th}$ scan images in order, where N is a positive integer greater than 2. The processing module is connected to the scanning module and executes the operations of: processing the $1^{st}$ to $N^{th}$ scan images to obtain $1^{st}$ to $N^{th}$ document images and sizes of the $1^{st}$ to $N^{th}$ document images; and performing an ordered document typesetting according to an ordered accumulated size of the $1^{st}$ to $N^{th}$ document images to generate image data corresponding to one or multiple output pages.

With the method and apparatus of the present invention, the judgement and comparison can be executed according to the accumulated size of the documents and the size(s) of the output page(s) to arrange the document images on one or multiple output pages in order, and to process the document images into the image data corresponding to the one or multiple output pages in order. In this manner, it is possible to prevent the waste from being caused when the small-size document image is printed on the large-size sheet, and the user may also obtain the order of documents according to the order of the output pages. So, the present invention can provide an instinctive and environment protective copying solution. Furthermore, it is also possible to judge whether the typesetting based on the size determination can be implemented or not, so that the output result can be further adjusted to achieve the copying technology further satisfying the environment protective requirement.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

DETAILED DESCRIPTION OF THE INVENTION

The present invention will be apparent from the following detailed description, which proceeds with reference to accompanying drawings.

Figure 1:
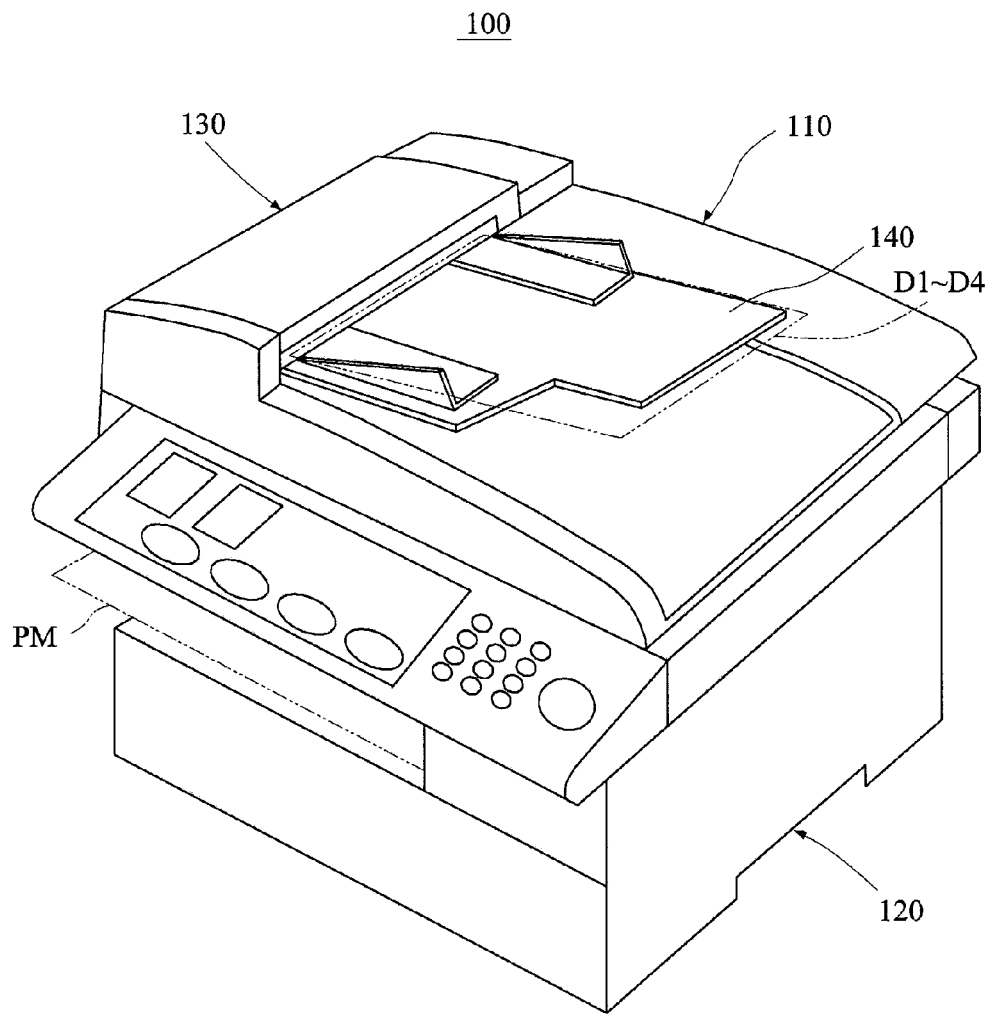
FIG. 1 is a pictorial outlook view showing an image-processing apparatus according to a preferred embodiment of the present invention.

FIG. 1 is a pictorial outlook view showing an image-processing apparatus 100 according to a preferred embodiment of the present invention. Referring to FIG. 1, the image-processing apparatus 100 comprises a scanning device 110, a printing device 120 and an automatic document feeder 130. In this embodiment, the image-processing apparatus 100 is a multi-function peripheral capable of executing the functions, such as scanning, printing, copying, electronic mail sending, faxing, network filing. The image-processing apparatus 100 in this embodiment may also be an image input device, such as a digital copier, a scanner, a fax machine or the like. The automatic document feeder 130 and the scanning device 110 of the image-processing apparatus 100 may cooperate with each other to automatically transport a lot of documents D1 to D4 (especially the documents with different sizes) placed in a supply tray 140, so that the automatic scanning effect can be achieved. The printing device 120 may print the scanned and typeset result on a print medium PM, which may be a sheet, a slide, or an output of an image file.

Figure 2:
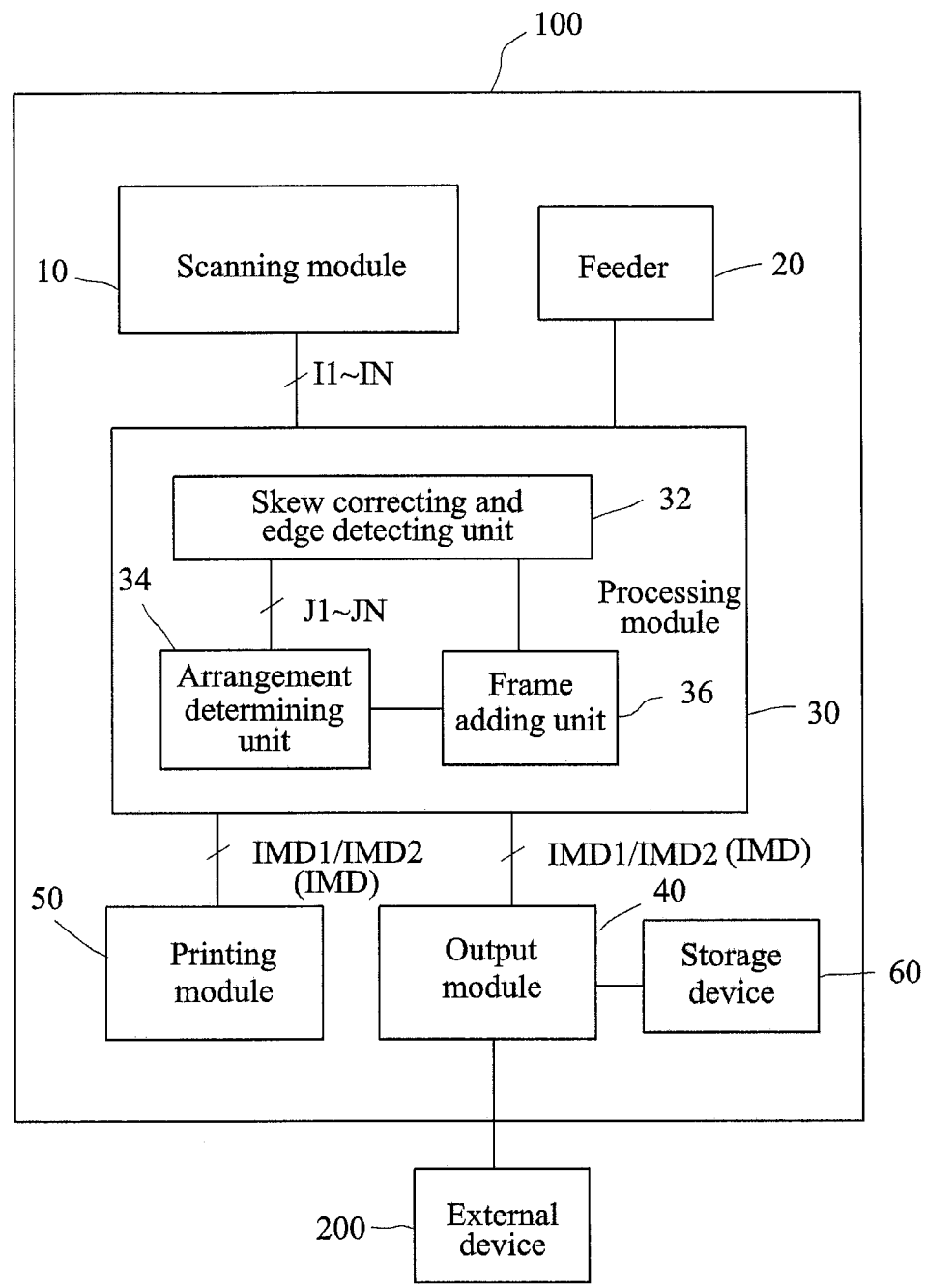
FIG. 2 is a block diagram showing the image-processing apparatus according to the preferred embodiment of the present invention.
Figure 3:
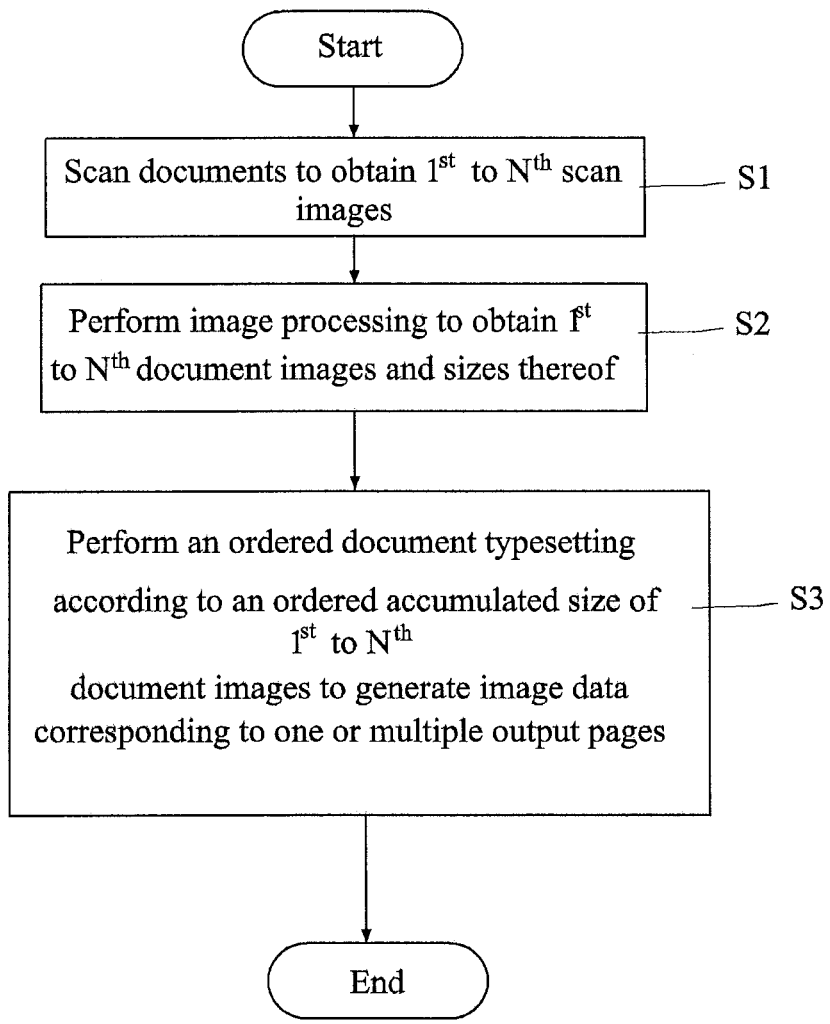
FIG. 3 is a flow chart showing a method for reproducing images according to the preferred embodiment of the present invention.

FIG. 2 is a block diagram showing the image-processing apparatus 100 according to the preferred embodiment of the present invention. FIG. 3 is a flow chart showing a method for reproducing images according to the preferred embodiment of the present invention. Referring to FIGS. 2, 3 and 1, the image-processing apparatus 100 comprises a scanning module 10, a feeder 20 and a processing module 30. The feeder 20 transports the documents D1 to D4 past the scanning module 10, and the scanning module 10 scans the images of the documents D1 to D4. The processing module 30 processes the image file obtained by the scanning of the scanning module by way of typesetting, editing and size adjusting, for example.

Referring to FIGS. 2 and 3, the method for reproducing the images comprises the following steps or operations. First, in step S1, the scanning module 10 scans the documents D1 to D4, having different sizes of document areas, to obtain $1^{st}$ to $N^{th}$ scan images I1 to IN, having different sizes of scan image areas, in order, where N is a positive integer greater than 2, In this embodiment, N is equal to 8. The processing module 30 is connected to the scanning module 10 and has program codes of software or firmware to automatically execute the following operations or steps.

Next, in step S2, the processing module 30 performs image processing to process the $1^{st}$ to $N^{th}$ scan images I1 to IN to obtain $1^{st}$ to $N^{th}$ document images J1 to JN, having different sizes of document image areas, and sizes of the $1^{st}$ to $N^{th}$ document images J1 to JN. The size comprises transversal and longitudinal dimensions. In one example, the processing module 30 comprises a skew correcting and edge detecting unit 32 for performing a skew correction and an edge detection on the $1^{st}$ to $N^{th}$ scan images I1 to IN to obtain the $1^{st}$ to $N^{th}$ document images J1 to A and the sizes thereof. In another example, the processing module 30 performs the edge detection and the skew correction or even a frame addition on the $1^{st}$ to $N^{th}$ scan images I1 to IN to obtain the $1^{st}$ to $N^{th}$ document images J1 to JN and the sizes thereof.

Then, in step S3, the processing module 30 performs an ordered document typesetting or layout to determine how many ordered document images of the $1^{st}$ to $N^{th}$ document images can be arranged in one output page or each of multiple output pages in order according to an ordered accumulated size of the $1^{st}$ to $N^{th}$ document images J1 to A to generate image data corresponding to one or multiple output pages. In this embodiment, the processing module 30 arranges the $1^{st}$ to $N^{th}$ document images J1 to A on one or multiple output pages OP1, OP2 (see FIGS. 6 to 8) and generates a typesetting result, and processes the $1^{st}$ to $N^{th}$ document images J1 to JN into image data IMD corresponding to the one or multiple output pages OP1, OP2 according to the typesetting result. In the output page OP1, a straight line STL connected to two middle points M1 and M2 of the ordered neighboring two different sizes of document image areas (corresponding to J2 and J3 of FIG. 6) with different horizontal dimensions and different vertical dimensions is at a non-perpendicular angle relative to one of edges EG of the output page OP1. A first processing mode and a second processing mode may be entered by the above-mentioned ordered document typesetting. In the first processing mode (also referred to as a simplex processing mode), the processing module 30 executes the ordered size determination according to the ordered accumulated size of the $1^{st}$ to $N^{th}$ document images J1 to JN and the size or sizes of the one or multiple output pages OP1, OP2 (see FIGS. 6 to 8). The main object thereof is to arrange the $1^{st}$ to $N^{th}$ document images J1 to JN on the one or multiple output pages in order, and thus to generate the typesetting result. Thus, the processing module 30 may further comprise an arrangement determining unit 34, which is electrically connected to the skew correcting and edge detecting unit 32 and executes the step S3. After the size determination is performed, the processing module 30 processes the $1^{st}$ to $N^{th}$ document images J1 to JN into the image data IMD of the one or multiple output pages in an ordered manner. The so-called "in an ordered manner" in this embodiment is based on the scan order in order to prevent the order of the documents placed by the user from being changed because the changed order may make the user confused. In another embodiment, the above-mentioned processing is executed based on the order of obtaining the images.

The output page may be one surface or include front and reverse sides of a virtual print medium, and correspond to the size of the image data to be finally outputted. The unit of the size may be inch, millimeter (mm), bit, pixel or the like. The so-called accumulated size in this embodiment is directed to the accumulated width and the accumulated length of the document images J1 to JN. Upon implementation, the widths of the $1^{st}$ to $2^{nd}$ document images are firstly summated to obtain the accumulated width, and then whether the accumulated width is greater than the width of the output page or not is judged. If the accumulated width is not greater than the width of the output page, it represents that the $1^{st}$ to $2^{nd}$ document images can be arranged horizontally in parallel, and then it is further judged whether that the accumulated width of the $1^{st}$ to $3^{rd}$ document images is greater than the width of the output page or not, and so on; and if the accumulated width is greater than the width of the output page, it is further judged whether the accumulated length of the $1^{st}$ to $2^{nd}$ document images is greater than the length of the output page. If the accumulated length of the $1^{st}$ to $2^{nd}$ document images is greater than the length of the output page, it represents that the $1^{st}$ to $2^{nd}$ document images cannot be arranged horizontally, and only can be vertically arranged on different pages, and so on.

Figure 4:
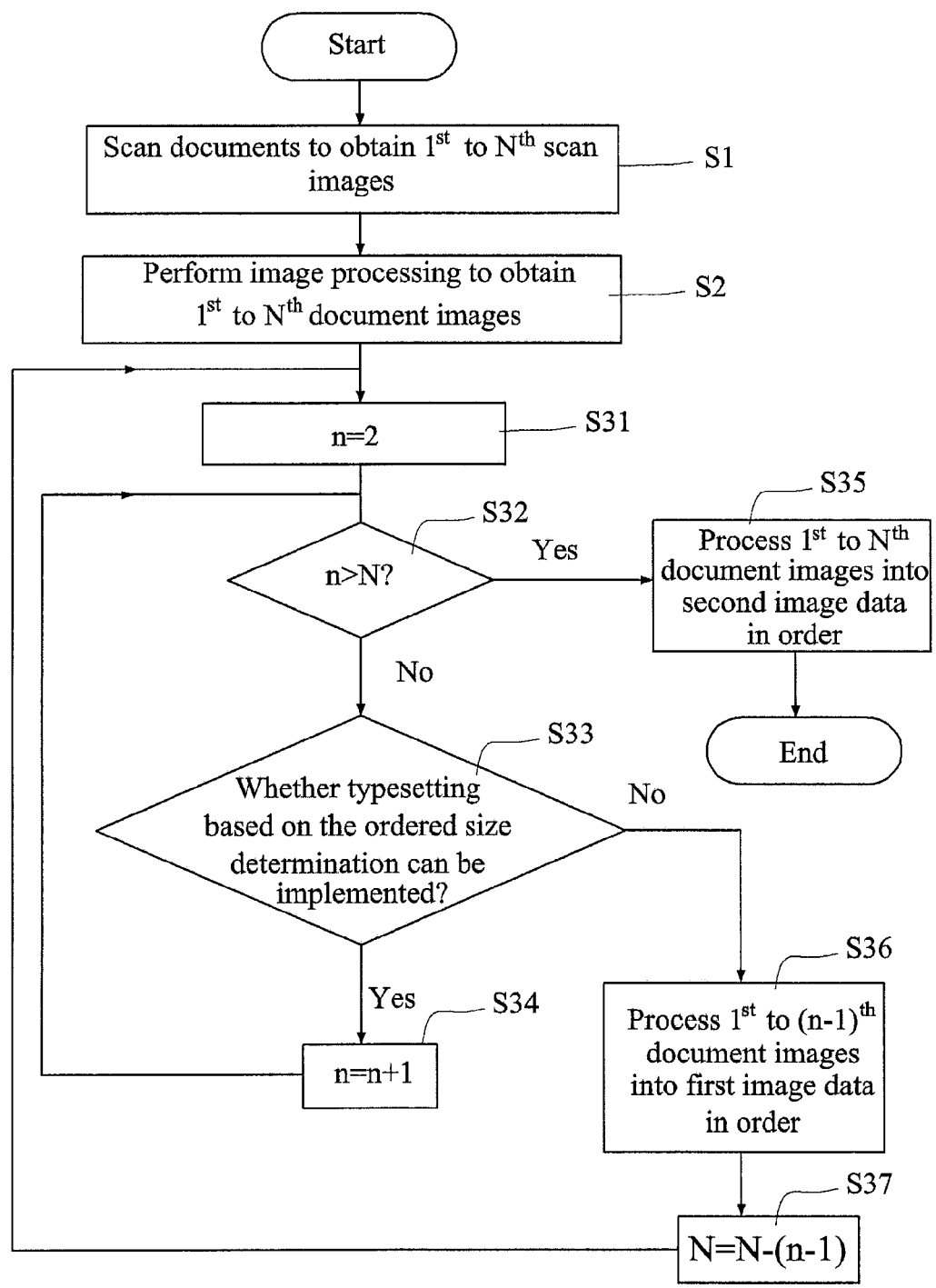
FIG. 4 is a flow chart showing a detailed example of the method for reproducing images according to a first embodiment of the present invention.

FIG. 4 is a flow chart showing a detailed example of the method for reproducing images according to a first embodiment of the present invention. Referring to FIGS. 4 and 3, the step S3 comprises steps S31 to S37. In the step S31, a parameter n is firstly set, where n is a positive integer greater than 1 and smaller than or equal to N, and n has an initial value equal to 2. Then, in the step S32, it is judged whether n is greater than N or not. If the judged result of the step S32 is negative, then the step S33 is executed to judge whether typesetting based on the ordered size determination can be implemented. That is, it is judged whether the 1st to $n^{th}$ document images J1 to Jn can be arranged on an output page in order. In one example, the arrangement determining unit 34 judges whether the 1st to $n^{th}$ document images J1 to Jn can be arranged on the output page along a horizontal direction and a vertical direction in order (i.e., arranged from left to right (horizontal direction) and from top to bottom (vertical direction) in order) with the order of the document images being kept unchanged, and the scaling ratio of the document image being kept at 1. In another embodiment, the order of the document image may be modified. In still another embodiment, the scaling ratio of the document may be modified and is thus unequal to 1, and the arrangement of the document images may be made in alignment with the center point of the document; wherein the scaling of the document may be made after the images with the original sizes are arranged so that the images may be scaled up or down to fit with one page.

If the judged result of the step S33 is affirmative, then the step S34 is executed to add 1 to n to obtain the new value of (n+1) (the programming of "n=n+1"), and then the process returns to step S32. That is the steps S33 and S36 are repeated until n is greater than N. If the judged result of the step S33 is negative, then the step S36 is executed to process the $1^{st}$ to $(n-1)^{th}$ document images J1 to Jn-1 into first image data IMD1 corresponding to the output page, then the step S37 is executed to reset N to N-(n-1), and then the process returns to the step S31.

If the judged result of the step S32 is affirmative, then it represents that the N document images can be arranged on the output page. So, the step S35 is executed to process the $1^{st}$ to $N^{th}$ document images J1 to JN into second image data IMD2 corresponding to the output page.

Figure 5:
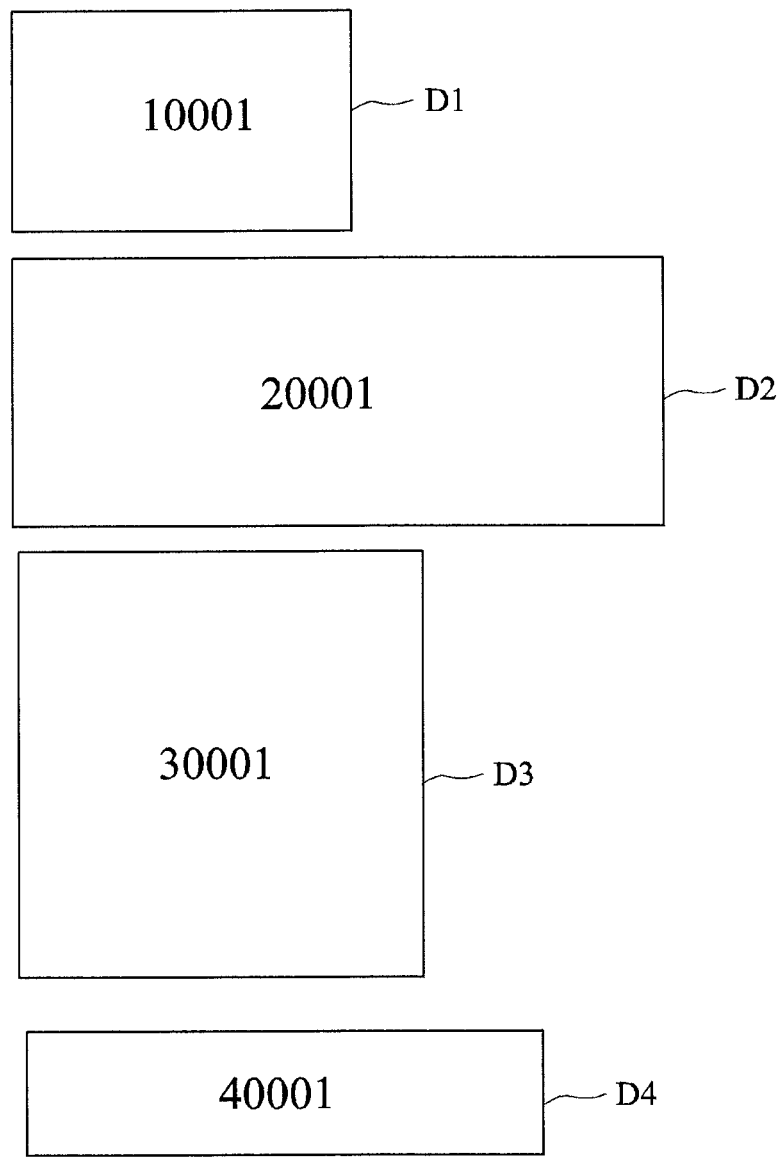
FIG. 5 is a schematic view showing documents.
Figure 6:
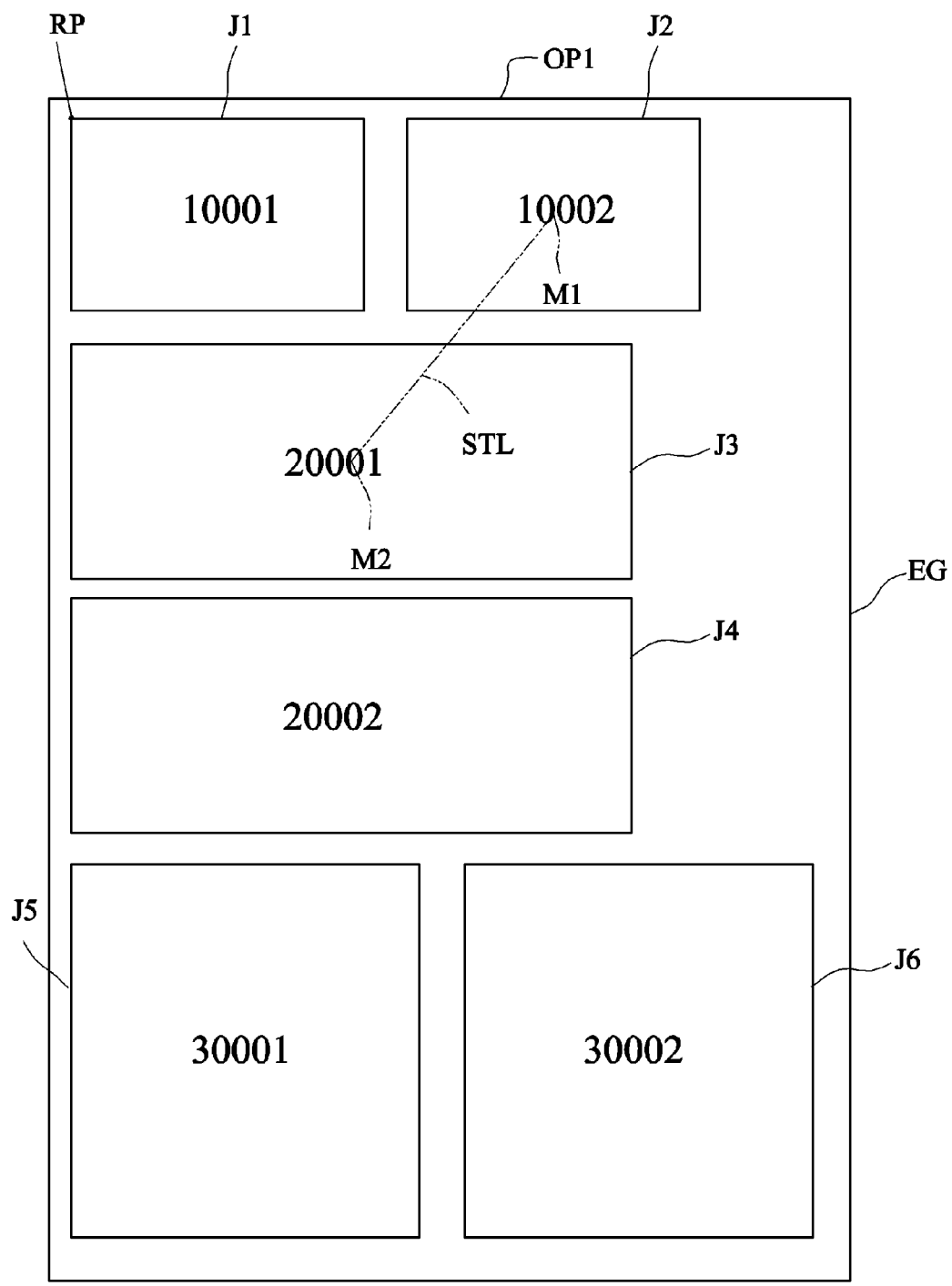
FIGS. 6 and 7 are schematic views showing simplex typesettings of output pages.
Figure 7:
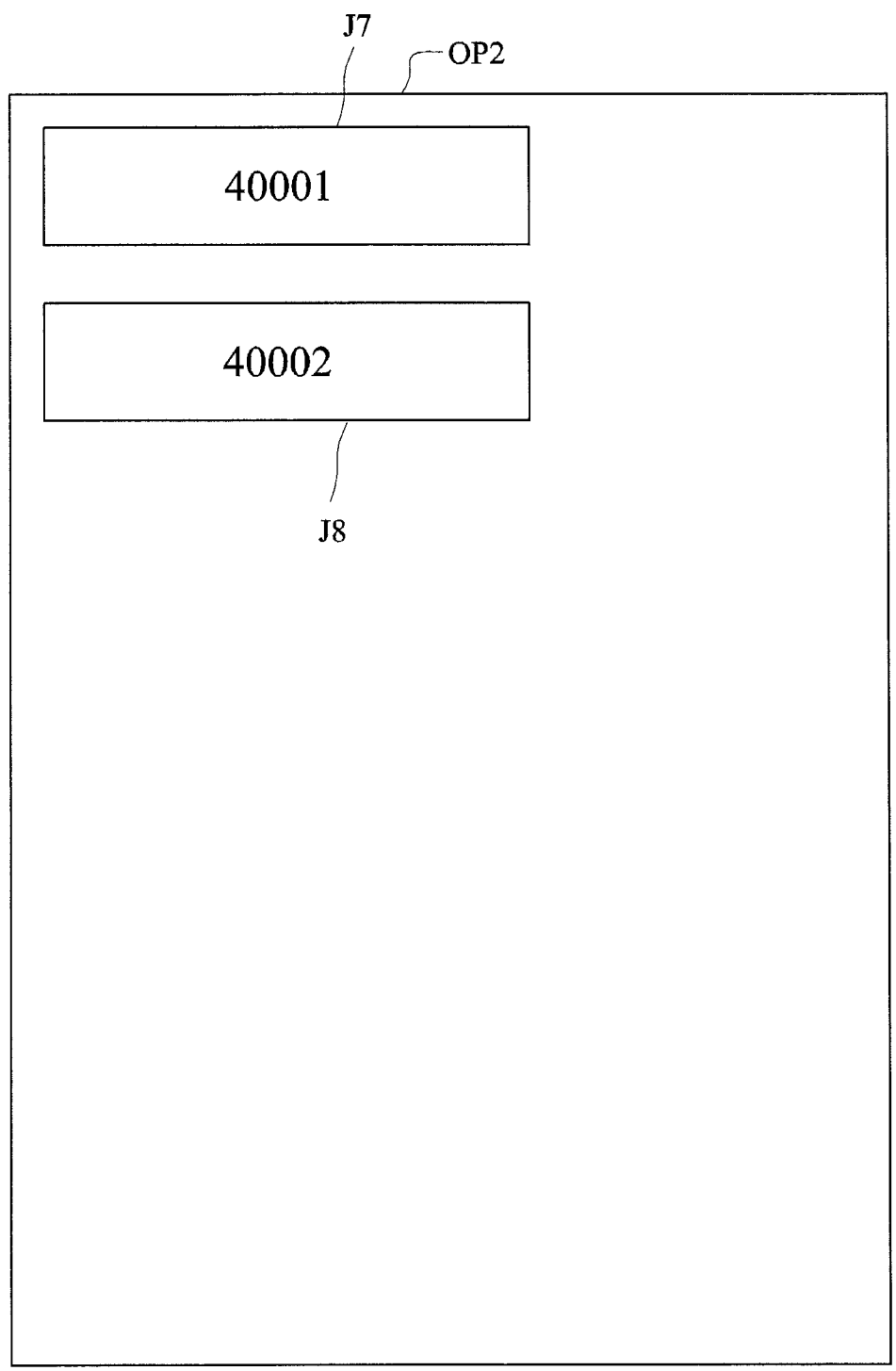

FIG. 5 is a schematic view showing documents D1 to D4. FIGS. 6 and 7 are schematic views showing simplex typesettings of output pages OP1 and OP2. It is worth noting that the document D1 has a front side printed with 10001, and a reverse side printed with 10002; the document D2 has a front side printed with 20001, and a reverse side printed with 20002; the document D3 has a front side printed with 30001, and a reverse side printed with 30002; and the document D4 has a front side printed with 40001, and a reverse side printed with 40002. Thus, in the step S1, the scanning module 10 scans the front and reverse sides of four documents D1 to D4 to obtain $1^{st}$ to $8^{th}$ scan images I1 to I8; in the step S2, the processing module 30 processes the $1^{st}$ to $8^{th}$ scan images I1 to I8 to obtain $1^{st}$ to $8^{th}$ document images J1 to J8; and after the processing module 30 executes the step S3, the obtained result represents that the document images J1 to J6 can be arranged on the output page OP1, and that the document images J7 to J8 only can be arranged on the output page OP2. So, the results of FIGS. 6 and 7 are obtained.

When the front and reverse sides are scanned, the following two hardware configurations may be adopted. In the first hardware configuration, the scanning module 10 is a duplex scanning module for scanning the front and reverse sides of the documents D1 to D4 to obtain the $1^{st}$ to $N^{th}$ scan images I1 to IN. In the second hardware configuration, the feeder 20 is a duplex feeder 20 for transporting the front and reverse sides of the documents D1 to D4 past the scanning module 10, which scans the front and reverse sides of the documents D1 to D4 to obtain the $1^{st}$ to $N^{th}$ scan images I1 to IN.

Upon typesetting, a reference point RP may be set on the output page OP1, so that the arrangement of the document images starts from this point. A spacing parameter may be set in each document image so that the neighboring document images can be separated. The image corresponding to the spacing parameter may be directly comprised in the document image, and may be a fully white image, a fully black image, an image with other colors or an image with other patterns, such as an outer frame of one single line for representing the front side image, an outer frame with dual lines for representing the reverse side image, an outer frame of one single line plus a fully white image, or the like, which does not intend to restrict the invention. Therefore, the processing module 30 may further comprise a frame adding unit 36 for adding a frame to the output of the skew correcting and edge detecting unit 32 to obtain the $1^{st}$ to $N^{th}$ document images J1 to JN.

In another embodiment, the spacing parameter may also be omitted from the output page, and be adjusted according to the count of horizontal or vertical arrangements of the document images. Of course, in still another embodiment, the spacing parameter may be omitted.

The accumulated width of the document images J1 and J2 is smaller than the width of the output page OP1, so the two document images J1 and J2 may be arranged horizontally. The accumulated width of the document images J1, J2 and J3 is greater than the width of the output page OP1, so the document image J3 must be arranged below the document image J1. The accumulated width of the document images J3 and J4 is greater than the width of the output page OP1, so the document image J4 must be arranged below the document image J3, and so on. So, the output page OP1 of FIG. 6 and the output page OP2 of FIG. 7 may be obtained. In FIGS. 6 and 7, the typesetting alignment is based on the reference point RP at the upper left corner, which means that the images are arranged from the upper left corner.

Although the output pages OP1 and OP2 have the same size in this embodiment, it is worth noting that the output pages OP1 and OP2 may also have different sizes in another embodiment.

Figure 8:
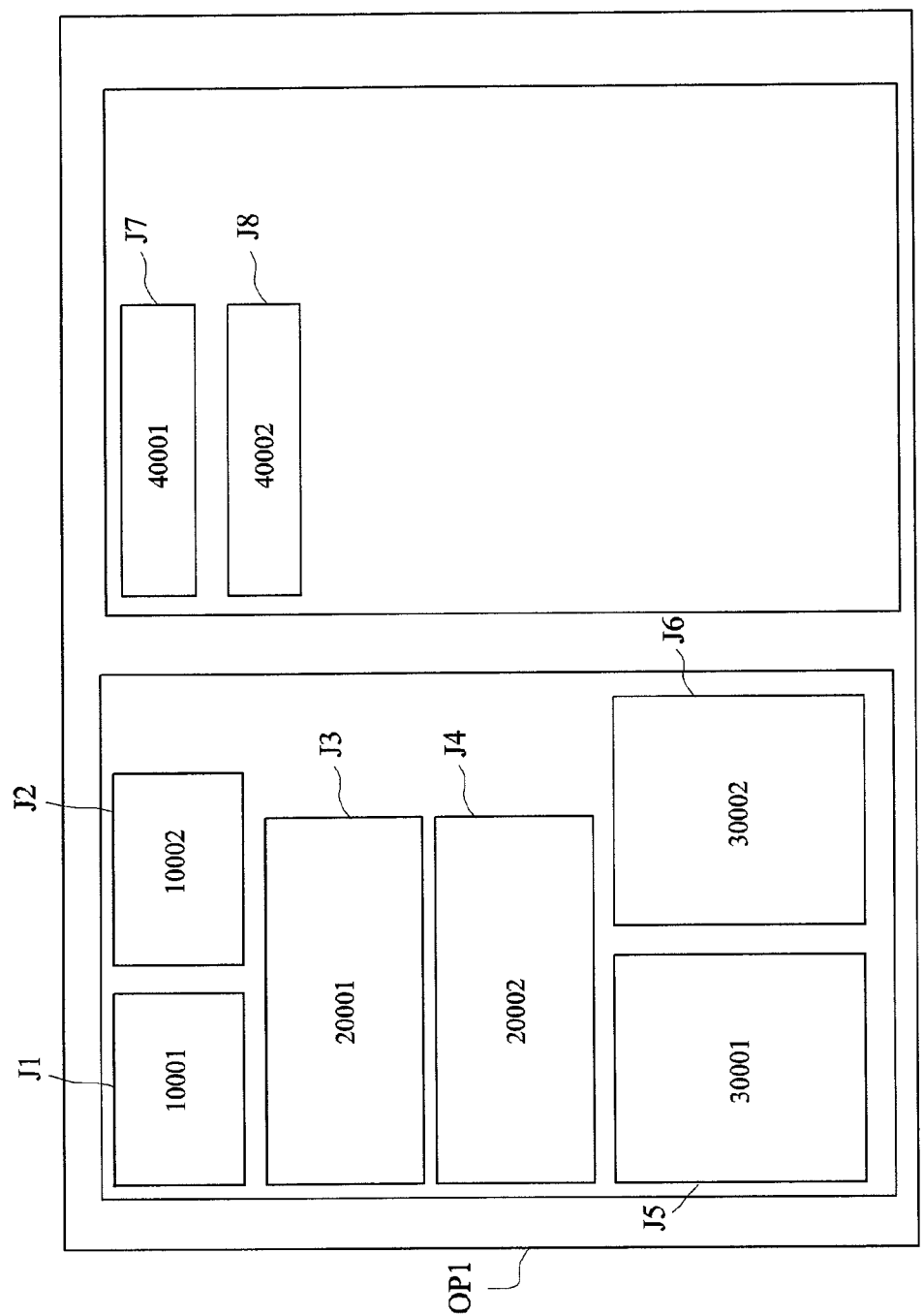
FIG. 8 is a schematic view showing a scaled-down typesetting of the output pages of FIGS. 6 and 7.

FIG. 8 is a schematic view showing a scaled-down typesetting of the output pages of FIGS. 6 and 7. As shown in FIG. 8, the processing module 30 executes the scaled-down typesetting of the output page according to user's setting or automatic judgement (e.g., the information regarding that the residual count of the print media PM is smaller than a predetermined value). That is, the images of FIGS. 6 and 7 are rotated by 90 degrees, and then scaled down and arranged on one output page OP1. Thus, when the total count of the first image data IMD1 and the second image data IMD2 is greater than or equal to 2 (two in FIGS. 6 and 7), rotating and scaling-down operations are performed on the first image data IMD1 and the second image data IMD2 to generate third image data corresponding to the output page OP1. It is worth noting that when there are two or more than two sets of image data, the scaling-down instruction is to arrange the images according to the predetermined typesetting and scale down the typeset images into the output page OP1. So, if there are three sets of output image data and the user sets one page of output, then the typesetting enters the predetermined template (e.g., four pages of typesetting output in OFFICE software), and ¼ of the output page is left blank.

Figure 9:
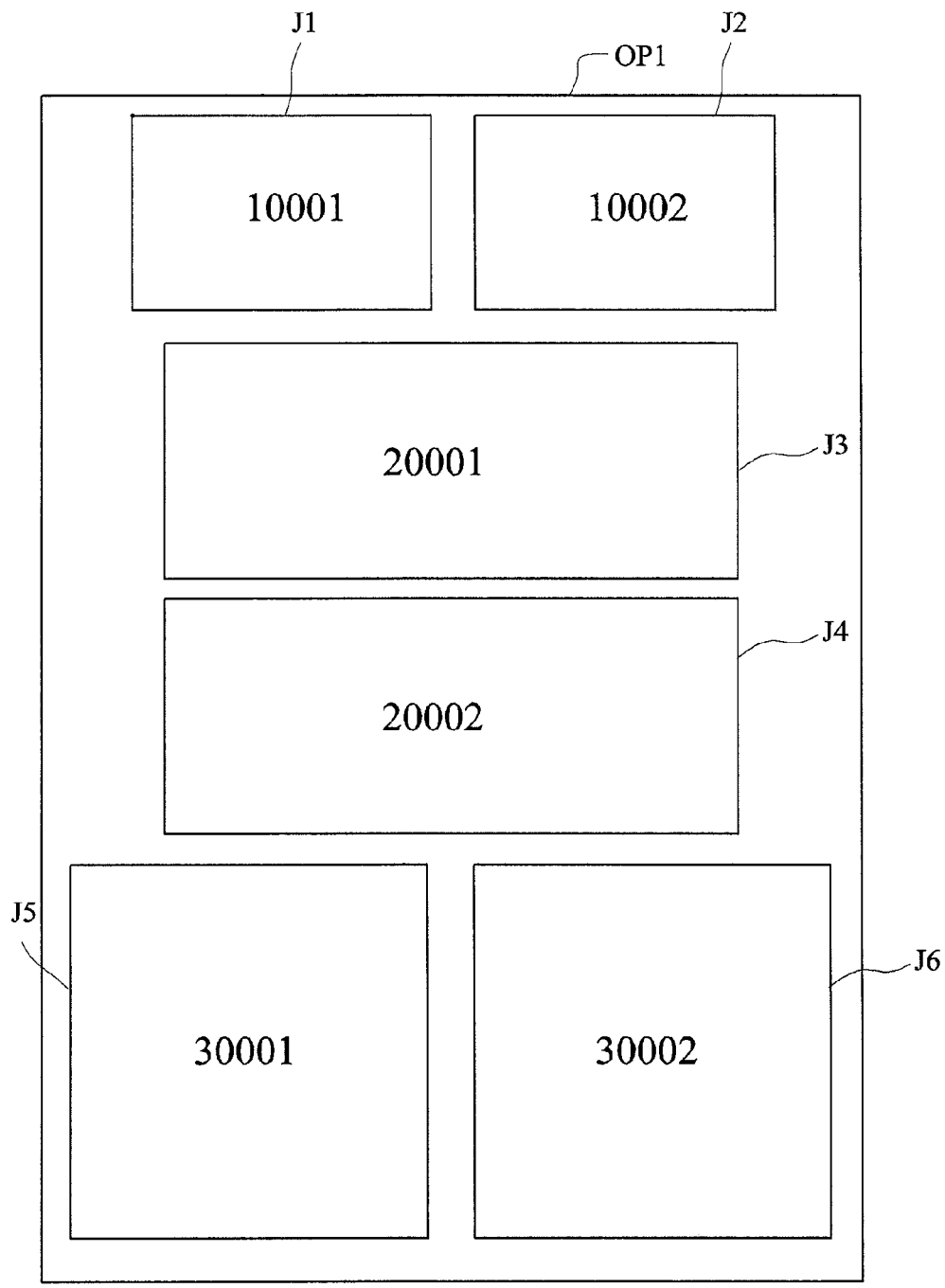
FIGS. 9 and 10 are schematic views showing other simplex typesettings of output pages.
Figure 10:
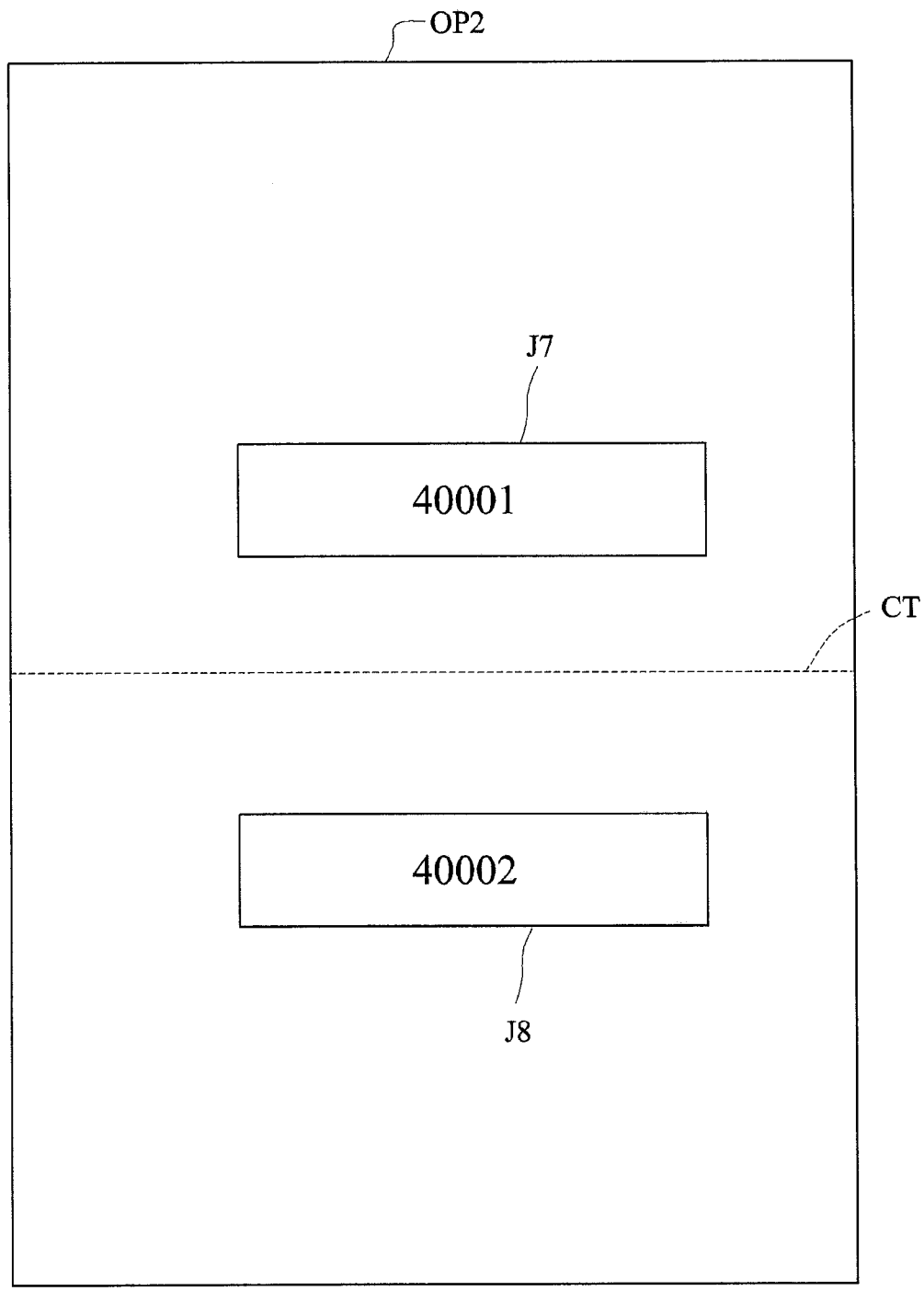
Figure 11:
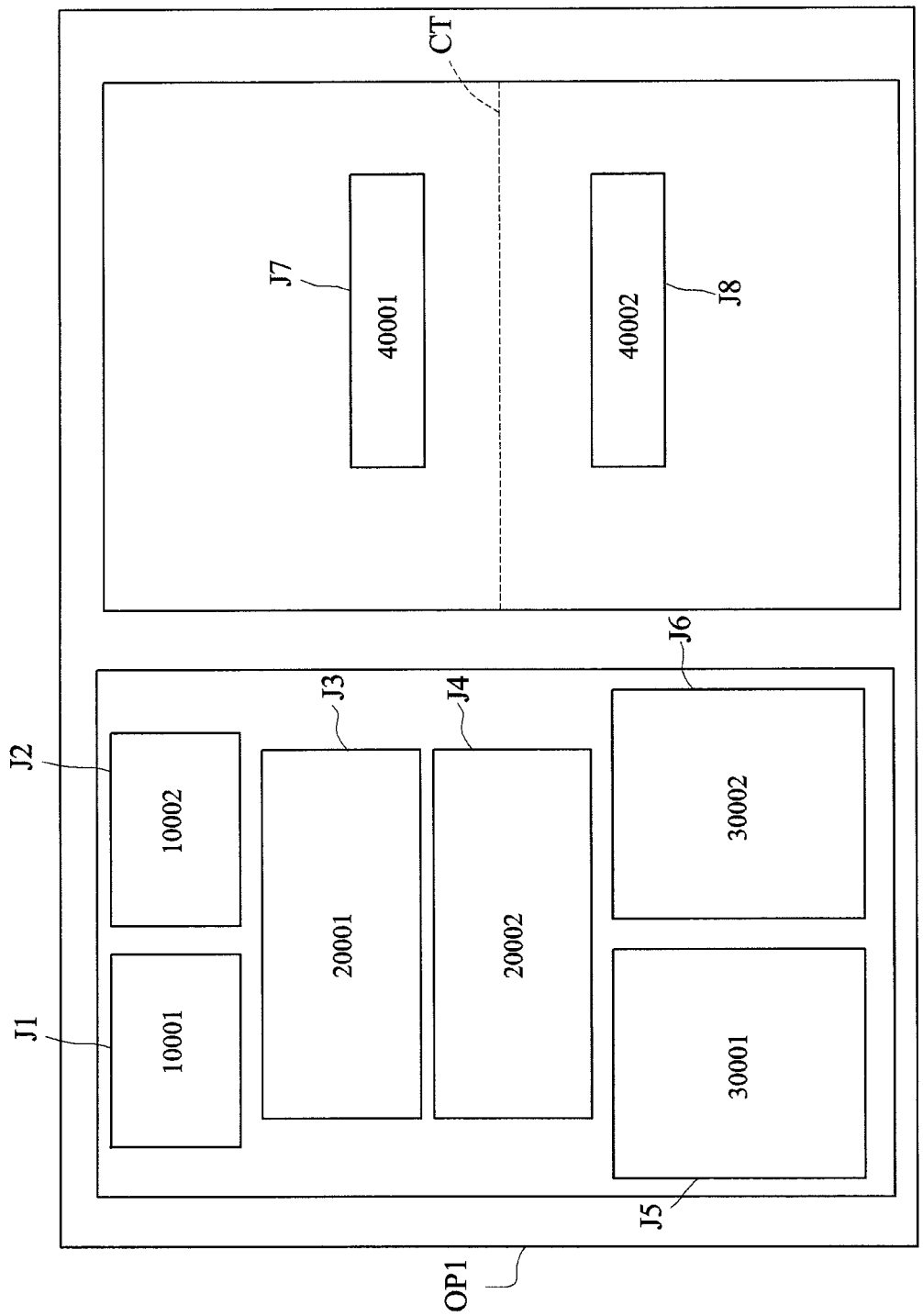
FIG. 11 is a schematic view showing a scaled-down typesetting of output pages of FIGS. 9 and 10.

FIGS. 9 and 10 are schematic views showing other simplex typesettings of output pages. The typesetting configuration pertains to the centrally aligned typesetting, and the output page OP2 of FIG. 10 is additionally printed with a cutting line CT. In another embodiment, however, the cutting line may also be omitted. FIG. 11 is a schematic view showing a scaled-down typesetting of output pages of FIGS. 9 and 10. Because FIG. 11 is similar to FIG. 8, detailed descriptions thereof will be omitted.

Figure 12:
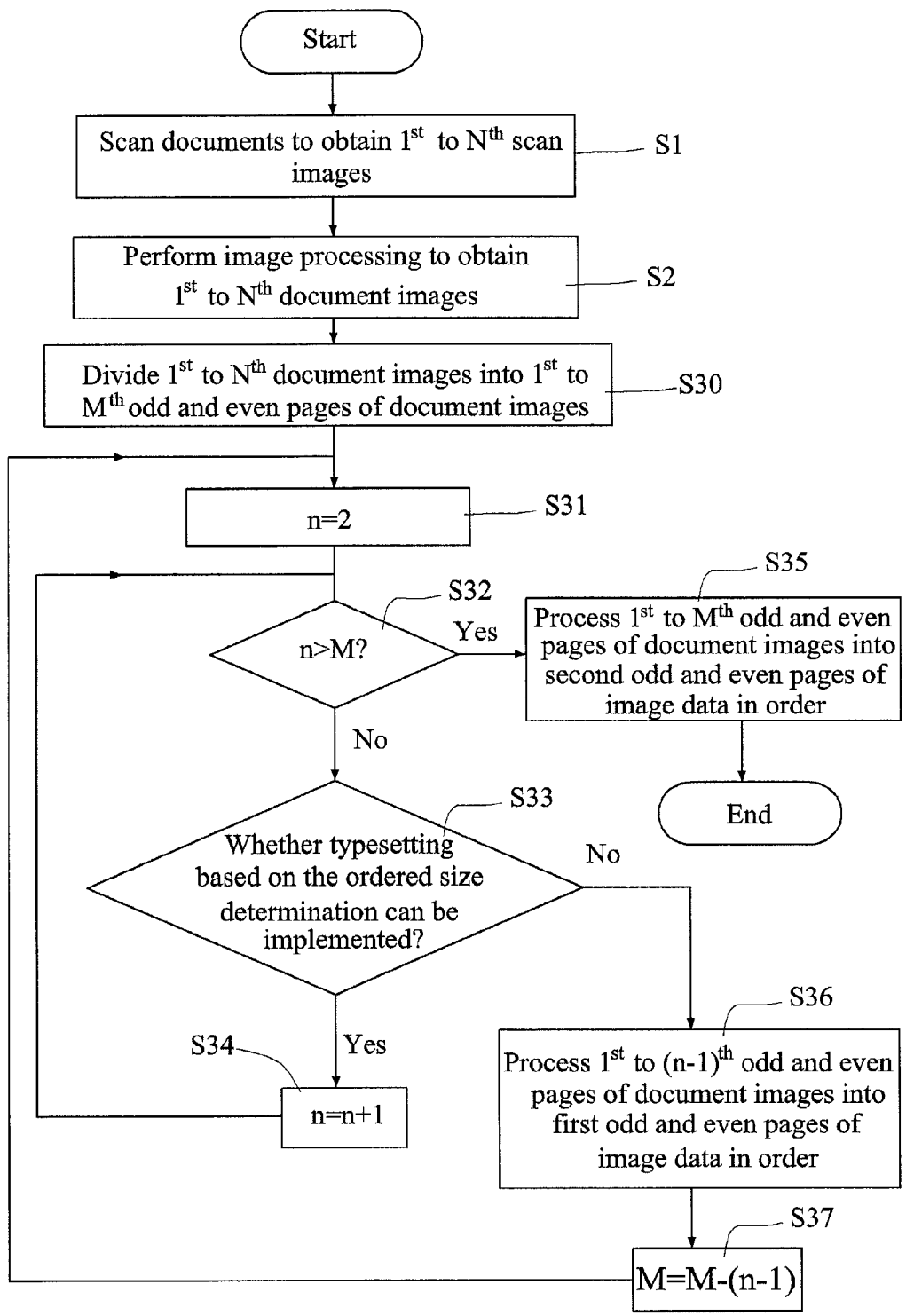
FIG. 12 is a flow chart showing a detailed example of a method for reproducing images according to a second embodiment of the present invention.
Figure 13:
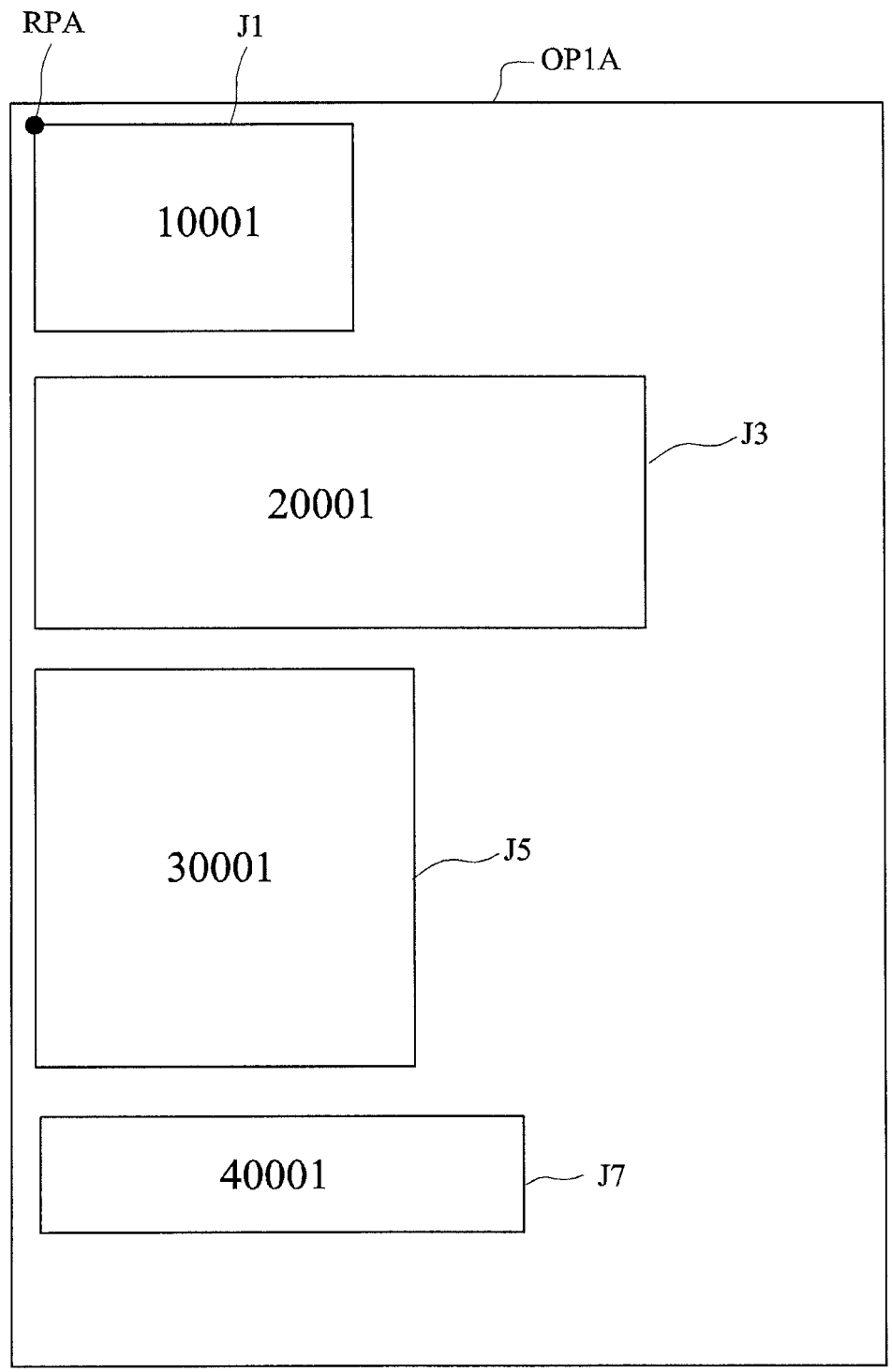
FIGS. 13 and 14 are schematic views showing duplex typesettings of an output page according to the second embodiment.
Figure 14:
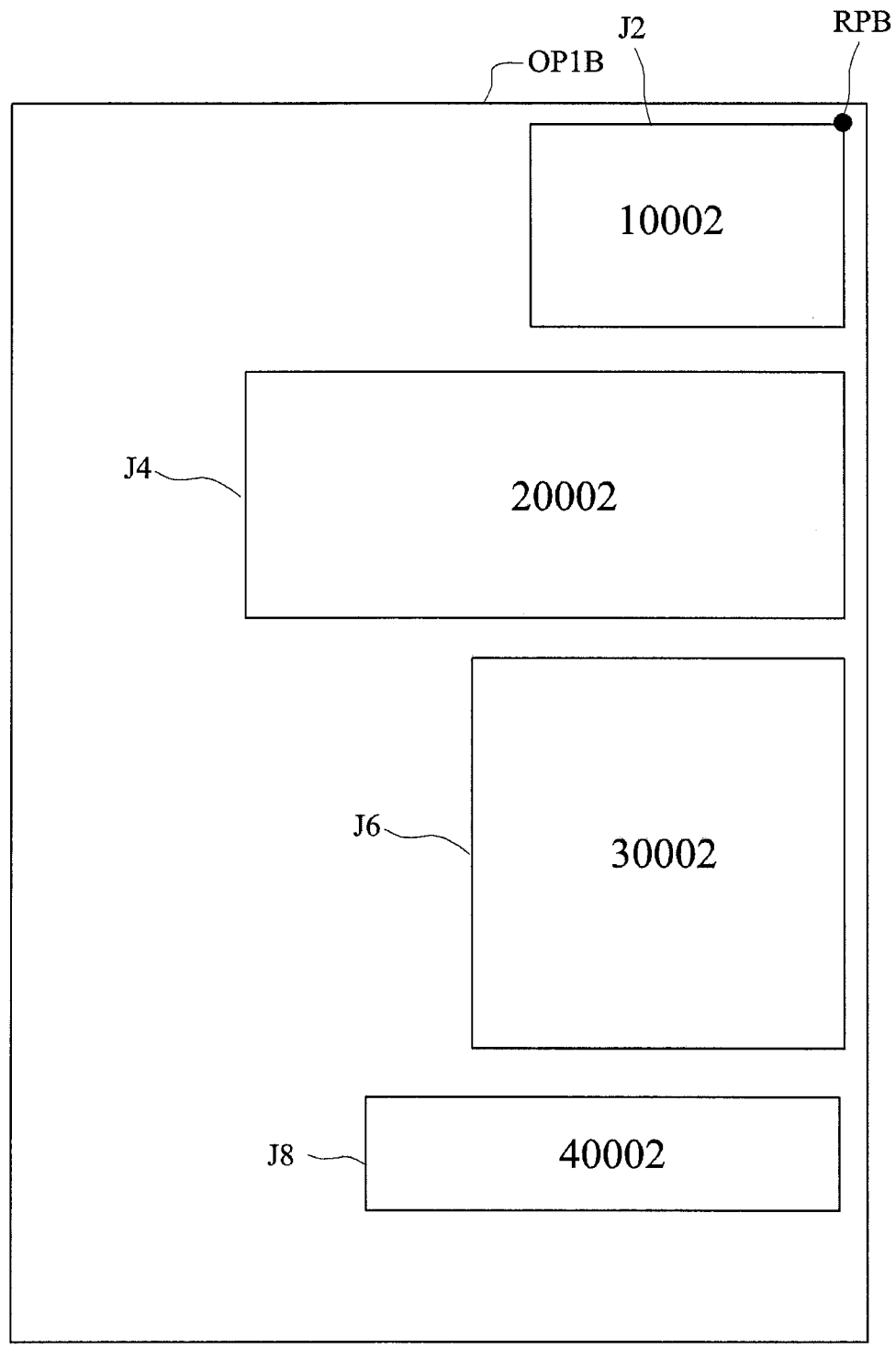

FIG. 12 is a flow chart showing a detailed example of a method for reproducing images according to a second embodiment of the present invention. FIGS. 13 and 14 are schematic views showing duplex typesettings of an output page according to the second embodiment. Referring to FIGS. 12 to 14, an ordered document typesetting is also executed according to an ordered accumulated size of the $1^{st}$ to $N^{th}$ document images to generate image data corresponding to one or multiple output pages. The output page OP1 comprises front and reverse sides of a virtual print medium, and the document images J1 to J8 corresponding to the front and reverse sides of the documents D1 to D4 have the back-to-back configuration. Thus, the user can perform the cutting according to the document image J1 to obtain the document images J1 and J2 printed on the front and reverse sides. The virtual print medium is directly presented in the database of the image-processing apparatus 100, and the size data thereof may correspond to one physical print medium, such as the A4 sheet, B4 sheet, or the like.

Referring to FIGS. 12 to 14, the step S3 comprises steps S30 to S37 in the second processing mode. In the step S30, the processing module 30 divides the $1^{st}$ to $N^{th}$ document images J1 to JN into $1^{st}$ to $M^{th}$ odd pages of document images J1, J3, J5 and J7, and $1^{st}$ to $M^{th}$ even pages of document images J2, J4, J6 and J8. Next, in the step S31, the processing module 30 sets a parameter n, where n is a positive integer greater than 1 and smaller than or equal to M, and n has an initial value equal to 2. Then, in the step S32, it is judged whether n is greater than M. If the judged result of the step S32 is negative, then the step S33 is executed to judge whether the typesetting based on the ordered size determination can be implemented or not, that is, to judge whether the $1^{st}$ to $n^{th}$ odd or even pages of document images can be arranged on the front side or reverse side of one output page in order. If the judged result of the step S33 is negative, then the step S36 is executed to process the $1^{st}$ to $(n-1)^{th}$ odd and even pages of document images into first odd and even pages of image data corresponding to the front and reverse sides of the output page, and then M is reset to M−(n−1) in the step S37. If the judged result of the step S33 is affirmative, then the value of n is added by 1, and the steps S32 to S33 are repeated until n is greater than M. In the step S32, when n is greater than M, the $1^{st}$ to $M^{th}$ odd and even pages of document images are processed into second odd and even pages of image data corresponding to the front and reverse sides of the output page. In this embodiment, because the document images J1, J3, J5 and J7 may be arranged on the front side OP1A of the output page and the reverse side OP1B of the output page, the process does not go to the step S36, but only goes to the step S35 to generate the second odd and even pages of image data shown in FIGS. 13 and 14, respectively.

Upon typesetting, a reference point RPA may be set at a distance from one edge of the front side OP1A of the output page so the odd pages of image data are arranged from this point, and a reference point RPB is also set at the same distance from the edge of the reverse side OP1B of the output page opposite to the front side OP1A of the output page so that the even pages of image data are arranged from this point.

Referring back to FIG. 2, the image-processing apparatus 100 further comprises an output module 40 and a printing module 50. The output module 40 is connected to the processing module 30, and outputs the image data IMD to one or both of an external device 200 and a storage device 60 of the image-processing apparatus 100. The external device 200 connected to the image-processing apparatus 100 may be an electronic device, such as a mobile phone, a computer, a server or a fax machine, or a cloud processor, so that the image data may be sent out by way of e-mail sending, faxing or network filing, for example. The printing module 50 is connected to the processing module 30, processes the image data IMD into print data, and prints the print data on one or multiple print media PM.

It is worth noting that the scaling-down and rotating typesetting of FIG. 11 may also be applied to the second embodiment. That is, when the processing module 30 judges that the total count of the first odd and even pages of image data and the second odd and even pages of image data is greater than or equal to 4 (there are two sets of first odd and even pages of image data and two sets of second odd and even pages of image data), one or both of rotating and scaling-down operations are performed on the first odd and even pages of image data and the second odd and even pages of image data to generate the third odd and even pages of image data corresponding to the front and reverse sides of the output page. In this embodiment, because only the second odd and even pages of image data are present (i.e., there are only two sets of image data in the second odd pages of image data and second even pages of image data), the scaled-down typesetting is not executed.

It is worth noting that the first and second processing modes may be present independently or concurrently. For example, the processing module may enter the first and second processing modes, wherein the first processing mode is to generate the output result according to the scan order to prevent the user from confusing the order. For example, the teacher may want to give different examination sheets to different students. On the other hand, the second processing mode is mainly to satisfy the environment protective requirement. For example, the teacher wants to keep the record regarding which examination sheets are given to which students.

With the embodiments of the present invention, the judgement and comparison can be executed according to the accumulated size of the documents and the size(s) of the output page(s) to arrange the document images on one or multiple output pages in order, and to process the document images into the image data corresponding to the one or multiple output pages in order. In this manner, it is possible to prevent the waste from being caused when the small-size document image is printed on the large-size sheet, and the user may also obtain the order of documents according to the order of the output pages. So, the present invention can provide an instinctive and environment protective copying solution. Furthermore, it is also possible to judge whether the typesetting based on the size determination can be implemented or not, so that the output result can be further adjusted to achieve the copying technology further satisfying the environment protective requirement.

While the present invention has been described by way of examples and in terms of preferred embodiments, it is to be understood that the present invention is not limited thereto. To the contrary, it is intended to cover various modifications. Therefore, the scope of the appended claims should be accorded the broadest interpretation so as to encompass all such modifications.

What is claimed is:

1. A method for reproducing images, the method being used in an image-processing apparatus and comprising the steps of:
    (a) obtaining $1^{st}$ to $N^{th}$ scan images, having different sizes of scan image areas, in order, with a scanning module of the image-processing apparatus to scan documents having different sizes of document areas, where N is a positive integer greater than 2;
    (b) processing the $1^{st}$ to $N^{th}$ scan images to obtain $1^{st}$ to $N^{th}$ document images, different sizes of document image areas, and sizes of the $1^{st}$ to $N^{th}$ document images, with a processing module of the image-processing apparatus;
    (c) performing an ordered document typesetting to determine how many ordered document images of the $1^{st}$ to $N^{th}$ document images can be arranged in one output page or each of multiple output pages in order based on a reference point at a corner of the one output page or each of the output pages according to an ordered accumulated size of the $1^{st}$ to $N^{th}$ document images and generating image data corresponding to the one or multiple output pages, with the processing module of the image-processing apparatus; and
    (d) processing the image data into print data and printing the print data on one or multiple print media by a printing module of the image-processing apparatus; or outputting the image data to one or both of a storage device of the image-processing apparatus and an external device through an output module of the image-processing apparatus, wherein in the output page or one of the output pages, a straight line connected to two middle points of the ordered neighboring two different sizes of document image areas with different horizontal dimensions and different vertical dimensions is at a non-perpendicular angle relative to one of edges of the output page.

2. The method according to claim 1, wherein in the step (c), an ordered size determination is performed according to the ordered accumulated size of the $1^{st}$ to $N^{th}$ document images and a size or sizes of the one or multiple output pages to arrange the $1^{st}$ to $N^{th}$ document images on the one or multiple output pages in order.

3. The method according to claim 1, wherein the step (c) comprises:
    (c1) judging whether the $1^{st}$ to $n^{th}$ document images can be arranged on the output page in order, where n is a positive integer greater than 1 and smaller than or equal to N;
    (c2) processing the $1^{st}$ to $(n-1)^{th}$ document images into first image data corresponding to the output page, and resetting N to N−(n−1) if the $1^{st}$ to $n^{th}$ document images cannot be arranged on the output page in order; and
    (c3) increasing n by 1 and repeating the steps (c1) to (c2) until n is greater than N if the $1^{st}$ to $n^{th}$ document images can be arranged on the output page in order, wherein when n is greater than N, the $1^{st}$ to $N^{th}$ document images are processed into second image data corresponding to the output page.

4. The method according to claim 3, wherein when a total count of the first image data and the second image data is greater than or equal to 2, the step (c) further comprises:
    (c4) performing rotating and scaling-down operations on the first image data and the second image data to generate third image data corresponding to the output page.

5. The method according to claim 1, wherein in the step (c), the $1^{st}$ to $N^{th}$ document images are divided into $1^{st}$ to $M^{th}$ odd pages of document images and $1^{st}$ to $M^{th}$ even pages of document images, an ordered size determination is performed according to an ordered accumulated size of the $1^{st}$ to $M^{th}$ odd or even pages of document images and a size or sizes of the one or multiple output pages to arrange the $1^{st}$ to $M^{th}$ odd pages of document images and the $1^{st}$ to $M^{th}$ even pages of document images on front and reverse sides of the one or multiple output pages in order, respectively, wherein the $1^{st}$ to $M^{th}$ even pages of document images are arranged on the front and reverse sides of the one or multiple output pages of the $1^{st}$ to $M^{th}$ odd pages of document images in a back-to-back manner, respectively.

6. The method according to claim 1, wherein the step (c) comprises:
    (c1) dividing the $1^{st}$ to $N^{th}$ document images into $1^{st}$ to $M^{th}$ odd pages of document images and $1^{st}$ to $M^{th}$ even pages of document images;
    (c2) judging whether the $1^{st}$ to $n^{th}$ odd or even pages of document images can be arranged on a front side or a reverse side of the output page in order, where n is a positive integer greater than 1 and smaller than or equal to M;
    (c3) processing the $1^{st}$ to $(n-1)^{th}$ odd and even pages of document images into first odd and even pages of image data corresponding to the front and reverse sides of the output page, and resetting M to M−(n−1) if the $1^{st}$ to $n^{th}$ odd or even pages of the document images cannot be arranged on the front side or the reverse side of the output page in order; and
    (c4) increasing n by 1 and repeating the steps (c2) to (c3) until n is greater than M if the $1^{st}$ to $n^{th}$ odd or even pages of the document images can be arranged on the front side or the reverse side of the output page in order, wherein when n is greater than M, the $1^{st}$ to $M^{th}$ odd and even pages of document images are processed into second odd and even pages of image data corresponding to the front and reverse sides of the output page.

7. The method according to claim 6, wherein when a total count of the first odd and even pages of image data and the second odd and even pages of image data is greater than or equal to 4, the step (c) further comprises:
    (c5) performing one or both of rotating and scaling-down operations on the first odd and even pages of image data and the second odd and even pages of image data to generate third odd and even pages of image data corresponding to the front and reverse sides of the output page.

8. The method according to claim 1, wherein the step (b) comprises:
    performing a skew correction, an edge detection and a frame addition on the $1^{st}$ to $N^{th}$ scan images to obtain the $1^{st}$ to $N^{th}$ document images.

9. An image-processing apparatus, comprising:
    a scanning module;
    a feeder for transporting documents past the scanning module, wherein the scanning module scans the documents, having different sizes of document areas, and obtains $1^{st}$ to $N^{th}$ scan images, having different sizes of scan image areas, in order, where N is a positive integer greater than 2;

a processing module, which is connected to the scanning module and executes the operations of:
  (a) processing the $1^{st}$ to $N^{th}$ scan images to obtain $1^{st}$ to $N^{th}$ document images, having different sizes of document image areas, and sizes of the $1^{st}$ to $N^{th}$ document images; and
  (b) performing an ordered document typesetting to determine how many ordered document images of the $1^{st}$ to $N^{th}$ document images can be arranged in one output page or each of multiple output pages in order based on a reference point at a corner of the one output page or each of the output pages according to an ordered accumulated size of the $1^{st}$ to $N^{th}$ document images to generate image data corresponding to the one or multiple output pages; and
one or both of a printing module and an output module, wherein the printing module is connected to the processing module, processes the image data into print data, and prints the print data on one or multiple print media, and the output module is connected to the processing module and outputs the image data to one or both of a storage device of the image-processing apparatus or an external device, wherein in the output page or one of the output pages, a straight line connected to two middle points of the ordered neighboring two different sizes of document image areas with different horizontal dimensions and different vertical dimensions is at a non-perpendicular angle relative to one of edges of the output page.

10. The image-processing apparatus according to claim 9, wherein the processing module performs an ordered size determination according to the ordered accumulated size of the $1^{st}$ to $N^{th}$ document images and a size or sizes of the one or multiple output pages to arrange the $1^{st}$ to $N^{th}$ document images on the one or multiple output pages in order.

11. The image-processing apparatus according to claim 9, wherein the operation (b) comprises:
  (b1) judging whether the $1^{st}$ to $n^{th}$ document images can be arranged on the output page in order, where n is a positive integer greater than 1 and smaller than or equal to N;
  (b2) processing the $1^{st}$ to $(n-1)^{th}$ document images into first image data corresponding to the output page, and resetting N to N-(n-1) if the $1^{st}$ to $n^{th}$ document images cannot be arranged on the output page in order; and
  (b3) increasing n by 1 and repeating the operations (b1) to (b2) until n is greater than N if the $1^{st}$ to $n^{th}$ document images can be arranged on the output page in order, wherein when n is greater than N, the $1^{st}$ to $N^{th}$ document images are processed into second image data corresponding to the output page.

12. The image-processing apparatus according to claim 11, wherein when a total count of the first image data and the second image data is greater than or equal to 2, the operation (b) further comprises:
  (b4) performing rotating and scaling-down operations on the first image data and the second image data to generate third image data corresponding to the output page.

13. The image-processing apparatus according to claim 9, wherein the processing module divides the $1^{st}$ to $N^{th}$ document images into $1^{st}$ to $M^{th}$ odd pages of document images and $1^{st}$ to $M^{th}$ even pages of document images, and performs an ordered size determination according to an ordered accumulated size of the $1^{st}$ to $M^{th}$ odd or even pages of document images and a size or sizes of the one or multiple output pages to arrange the $1^{st}$ to $M^{th}$ odd pages of document images and the $1^{st}$ to $M^{th}$ even pages of document images on front and reverse sides of the one or multiple output pages in order, respectively, wherein the $1^{st}$ to $M^{th}$ even pages of document images are arranged on the front and reverse sides of the one or multiple output pages of the $1^{st}$ to $M^{th}$ odd pages of document images in a back-to-back manner.

14. The image-processing apparatus according to claim 9, wherein the operation (b) comprises the steps of:
  (b1) dividing the $1^{st}$ to $N^{th}$ document images into $1^{st}$ to $M^{th}$ odd pages of document images and $1^{st}$ to $M^{th}$ even pages of document images;
  (b2) judging whether the $1^{st}$ to $n^{th}$ odd or even pages of document images can be arranged on a front side or a reverse side of the output page in order, where n is a positive integer greater than 1 and smaller than or equal to M;
  (b3) processing the $1^{st}$ to $(n-1)^{th}$ odd and even pages of document images into first odd and even pages of image data corresponding to the front and reverse sides of the output page, and resetting M to M-(n-1) if the $1^{st}$ to $n^{th}$ odd or even pages of document images cannot be arranged on the front side or the reverse side of the output page in order; and
  (b4) increasing n by 1 and repeating the steps (b2) to (b3) until n is greater than M if the $1^{st}$ to $n^{th}$ odd or even pages of document images can be arranged on the front side or the reverse side of the output page in order, wherein when n is greater than M, the $1^{st}$ to $M^{th}$ odd and even pages of document images are processed into second odd and even pages of image data corresponding to the front and reverse sides of the output page.

15. The image-processing apparatus according to claim 14, wherein when a total count of the first odd and even pages of image data and the second odd and even pages of image data is greater than or equal to 4, the operation (b) further comprises the step of:
  (b5) performing one or both of rotating and scaling-down operations on the first odd and even pages of image data and the second odd and even pages of image data to generate third odd and even pages of image data corresponding to the front and reverse sides of the output page.

16. The image-processing apparatus according to claim 9, wherein the processing module comprises:
  a skew correcting and edge detecting unit for performing a skew correction and an edge detection on the $1^{st}$ to $N^{th}$ scan images to obtain the $1^{st}$ to $N^{th}$ document images.

17. The image-processing apparatus according to claim 16, wherein the processing module further comprises:
  an arrangement determining unit, which is electrically connected to the skew correcting and edge detecting unit, and executes the operation (b).

18. The image-processing apparatus according to claim 9, wherein the processing module comprises:
  a skew correcting and edge detecting unit for performing a skew correction and an edge detection on the $1^{st}$ to $N^{th}$ scan images;
  a frame adding unit for adding a frame to an output of the skew correcting and edge detecting unit to obtain the $1^{st}$ to $N^{th}$ document images; and
  an arrangement determining unit, which is electrically connected to the skew correcting and edge detecting unit and executes the operation (b).

* * * * *